United States Patent [19]
Williams et al.

[11] Patent Number: 5,542,138
[45] Date of Patent: Aug. 6, 1996

[54] BEDSIDE CONTROL UNIT FOR A HOSPITAL BED

[76] Inventors: Terry N. Williams, 4106 Wake Forest Rd. Suite 3; George R. Parrish, 815-12 Marlowe Rd., both of Raleigh, N.C. 27609

[21] Appl. No.: 383,997

[22] Filed: Feb. 6, 1995

[51] Int. Cl.⁶ .............................. A47C 21/00; A61G 7/06
[52] U.S. Cl. .................... 5/658; 5/503.1; 5/600
[58] Field of Search ................... 5/600, 658, 503.1, 5/507.1, 424; 248/458, 442.2, 447, 447.2, 278

[56] References Cited

U.S. PATENT DOCUMENTS

| | | | |
|---|---|---|---|
| 3,358,957 | 12/1967 | Lindenmuth | 5/503.1 X |
| 3,889,914 | 6/1975 | Torme | 5/503.1 X |
| 4,612,679 | 9/1986 | Mitchell | 5/658 X |
| 4,680,790 | 7/1987 | Packard et al. | 5/600 X |
| 5,072,906 | 12/1991 | Foster | 5/658 X |
| 5,186,337 | 2/1993 | Foster et al. | 5/658 X |

FOREIGN PATENT DOCUMENTS 789207  7/1968  Canada ....................... 5/658

*Primary Examiner*—Michael F. Trettel
*Attorney, Agent, or Firm*—Rhodes, Coats & Bennett, L.L.P.

[57] ABSTRACT

A bedside control unit for a hospital bed is operable from a position within the bed and also from a bedside chair. The bedside control unit includes a base which attaches to the frame of a hospital bed. An articulated support is connected to the base which includes a vertically extending support member pivotally connected to the base, and an overhead support arm pivotally connected to an upper end of the support member. The control module is suspended from the overhead support arm. The support arm is moveable between a first position in which the support arm extends over the hospital bed and a second position in which the support arm extends outward from the bed. In a preferred embodiment of the invention, the bedside control unit includes data storage means for storing data, such as patient information, and a display for displaying information stored in the control module.

40 Claims, 9 Drawing Sheets

BEDSIDE CONTROL UNIT FOR A HOSPITAL BED

FIELD OF THE INVENTION

The present invention relates generally to hospital bed controls, and more particularly to a bedside control module for hospital beds mounted on an articulating support.

BACKGROUND OF THE INVENTION

Bedside control systems are commonly used in the health care industry to make various control functions accessible to patients. Bedside controllers are typically used for bed adjustment, nurse calls, and for control of appliances such as radio, television, telephone and lights. Examples of such controllers are pendant speaker systems and side rail controls. One example of a side rail control is shown in U.S. Pat. No. 4,680,790 to Packard et al.

One inherent problem with current side rail controls or pendant speaker systems is that confused or challenged patients have a great deal of difficulty locating and manipulating the controls. For example, pendant speaker systems are not mounted in a fixed location and can be lost in the bed clothes. In the case of side rail controls, they are frequently mounted in locations which are not convenient or conducive to their use.

Another disadvantage of side-rail controls and pendant speaker systems is that they are generally accessible to the patient only when the patient is in the hospital bed. After surgery or other treatment, it is generally desirable to ambulate the patient as soon as is medically practicable. Studies show that ambulating patients as quickly as possible after surgical procedures decreases the patient's recovery time and also the overnight stays required. Patients are therefore encouraged to sit upright in a bedside chair in the patient's hospital room rather than remain confined in the hospital bed. Current pendant systems and side rail controllers are frequently inaccessible to the patient once the patient is out of the hospital bed.

Current side rail control systems are also inaccessible to the visiting family member who might be staying with the patient during recovery. The existing T.V. controls and other environmental controls are not accessible to the visitor when they are fixed to the bed side

SUMMARY OF THE INVENTION

The bedside control system of the present invention is designed to provide all of the control functions of the patient environment in a convenient location which is readily accessible to a patient confined to a hospital bed. A control panel is mounted on an articulating arm that allows freedom of movement in all planes. The articulating arm structure provides an overhead support which makes it easier for the challenged or impaired patient to locate and use the control panel. The articulating arm structure also allows the use of the bedside control by the patient even when the patient is seated in a bedside chair. The articulating arm structure mounts to either the right or left side of the bed frame. A connector interfaces with the existing control system of the bed.

The design of the control panel also takes into an account the needs of the physically-challenged patient. Integral handles are formed in the control panel to allow easy manipulation of the control panel by physically-challenged patients. Further, all control panel functions are back lighted and include raised Braille for the vision impaired. The telephone system should preferably be hearing-aid compatible.

In another aspect of the present invention, the bedside control unit may be used for bedside charting. The bedside control module includes data-storage means for the storage of patient data. In a preferred embodiment of the invention, a keyboard and multi-line display is integrally mounted on a back side of the control module. The keyboard allows entry of patient data into the control module which can subsequently be viewed on the display The bedside control modules can also be linked to a central computer by a suitable remote communications media so that this information is remotely accessible.

Other objects and advantages of the present invention will become apparent and obvious from a study of the following description and the accompanying drawings which are merely illustrative of such invention.

DETAILED DESCRIPTION OF THE INVENTION

Figure 1:
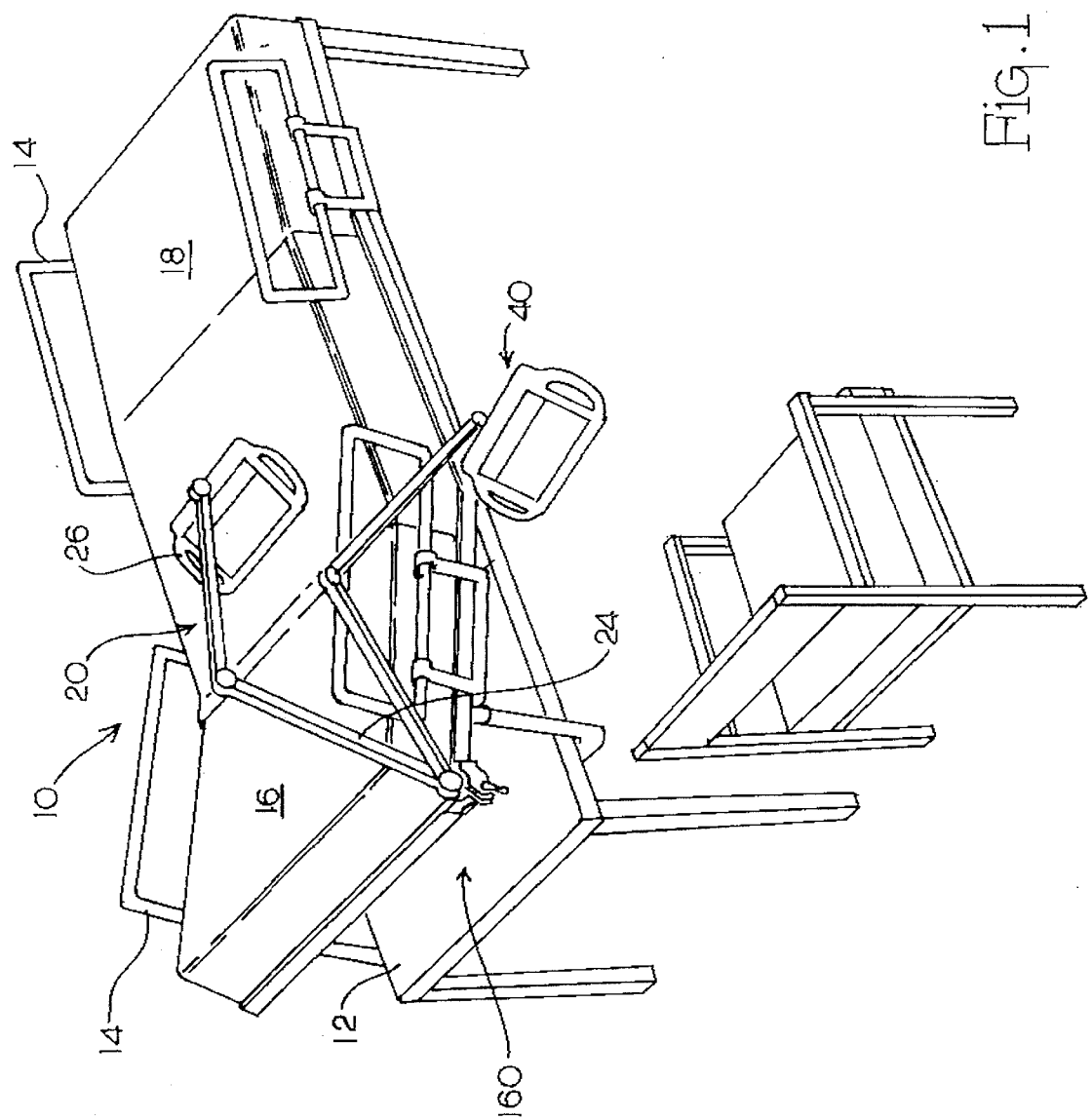
FIG. 1 is a perspective view of the bedside control module of the present invention shown attached to an adjustable hospital bed.

Referring now to the drawings, FIG. 1 shows a hospital bed 10 including a support frame 12, side rails 14, and adjustable head and knee sections 16 and 18 respectively. Hospital beds 10 of the type shown in the drawings are well known to those skilled in the art and typically include electrical control means for independently adjusting the head and knee sections 16 and 18. The bedside control system of the present invention comprises a control panel 40 supported above the hospital bed by an articulating arm structure 20 that allows freedom of movement in all planes. The articulating arm structure 20 is secured to the bed frame by a mounting bracket. The arm structure includes a first support arm 24 extending upwardly from the mounting bracket, and a second support arm 26 which is connected to the end of the first support arm 24. The control panel 40 is mounted to the outer end of the second support arm 26.

The articulating arm structure 20 suspends the control panel 40 in an overhead position relative to the hospital bed 10. The articulating arm structure 20 is moveable between a first position in which the articulating arm structure 20 extends over the hospital bed 10, and a second position in which the articulating arm structure 20 extends outwardly to one side of the bed 10. Thus, the articulating arm structure 20 can be used as an overhead support when the patient is confined to the hospital bed, or as a bedside support when the patient is sitting in a bedside chair.

Figure 2:
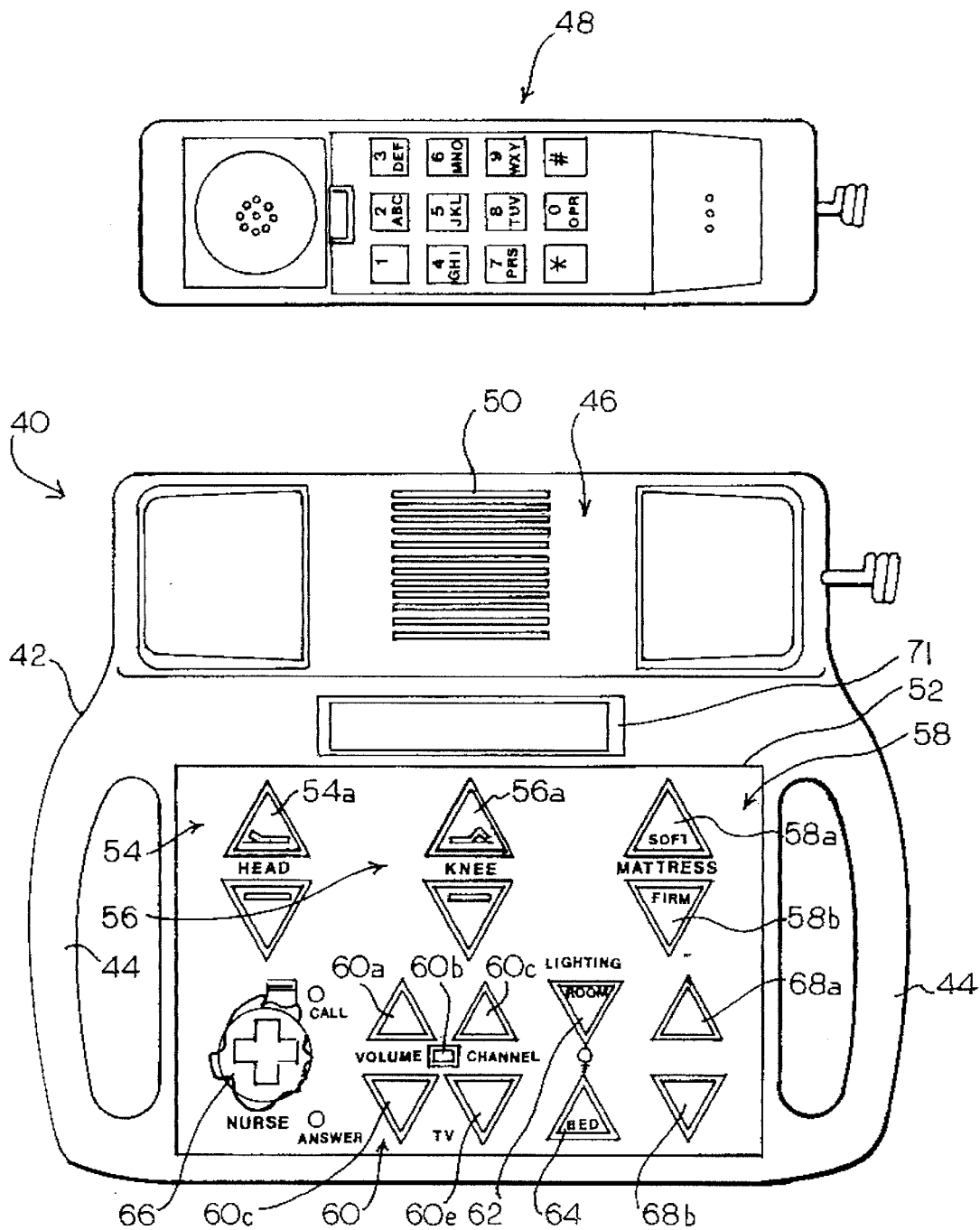
FIG. 2 is a front elevation view of the control module.

Referring now to FIG. 2, the control module 40 is shown. The control module 40 includes a housing 42 having integral handles 44 on the sides of the housing 42. The handles 44 allow easy manipulation of the control module 40 by physically-challenged patients. At the top of the housing 42, a hand-set receiving area 46 is formed for docking a conventional telephone handset 48. A integral speaker 50 is mounted within the handset receiving area 46. A digital display 71 is also included for time and date display.

A control panel 52 is mounted on the front of the control module 40 below the handset receiving area 46. The control panel 52 includes a plurality of membrane switches which are actuated by an associated push button. In the illustrated embodiment, the push buttons include bed controls 54, 56, and 58, T.V. controls 60, a "nurse call" button 66, lighting controls 62, 64 and auxiliary controls 68. The bed controls include head control buttons 54a and 54b for adjusting the head section 16 of the bed 12, knee control buttons 56a and 56b for controlling the knee section 18 of the bed 12, and mattress adjustment buttons 58a and 58b for adjusting the firmness of the mattress in hospital beds equipped with this function. The T.V. controls 60 include volume control buttons 60a and 60b, a channel control button 60c, an "on/off" button 60d, and a mute button 60e. The lighting controls 62, 64 control both the room lights and reading lights. The "nurse call" button 66 is used to signal the nurse. The auxiliary control buttons 68a and 68b provide an additional control for optional equipment to allow some customization of the control module 40. Control panel buttons are back lighted and in raised Braille for the vision impaired.

Figure 3:
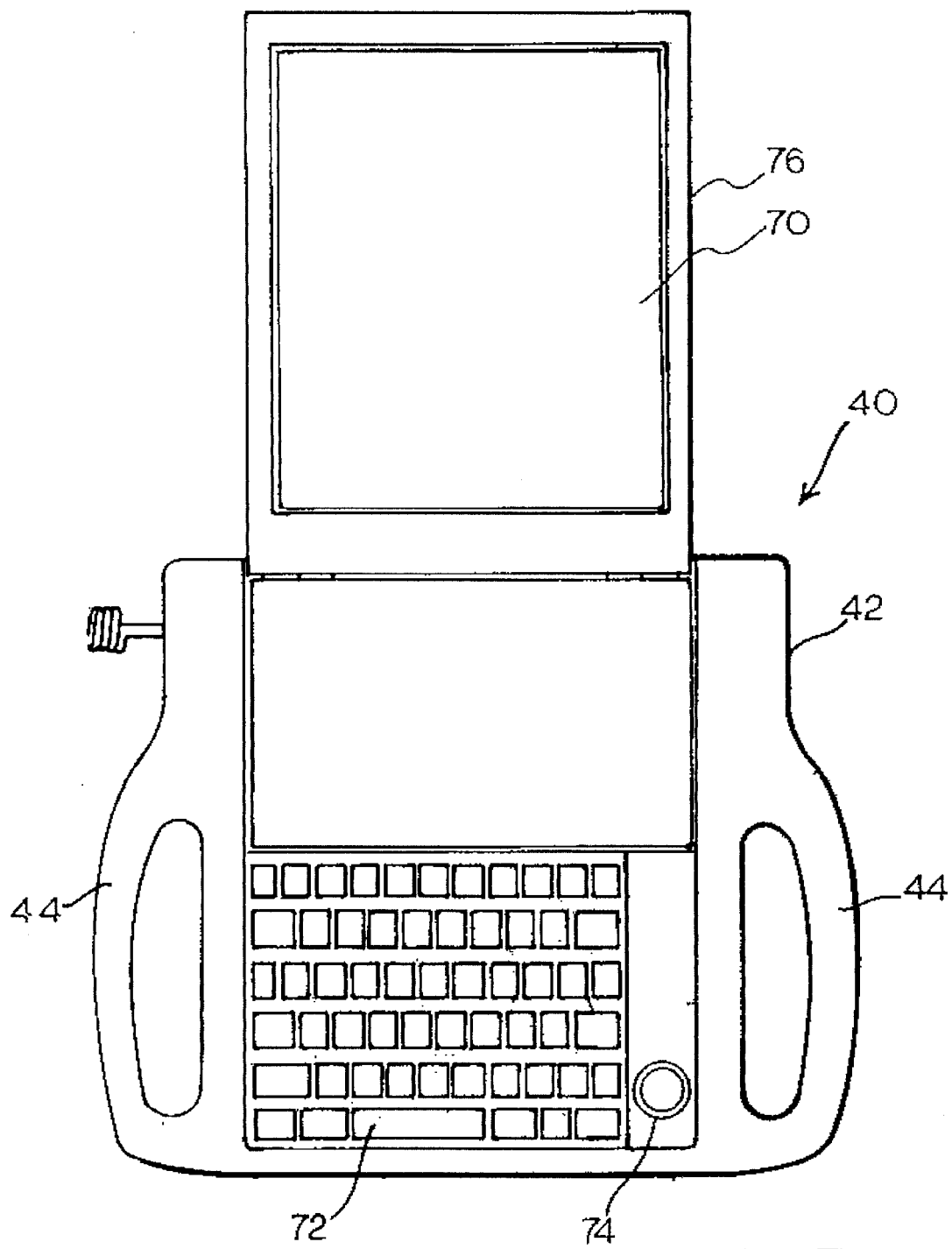
FIG. 3 is a rear elevation view of the control module.

Referring now to FIG. 3, the back of the control module 40 is shown. A display panel 76 is connected to the housing 42 by a hinge in a manner similar to the display of a lap-top computer. The display panel 76 is movable between a folded position against the back side of the housing 42 unit and an upright position as seen in FIG. 3. The display panel 76 includes a multi-line display 70. The multi-line 70 may be used to display video as well as to provide an interface with the control module 40. An input device, such as a keyboard 72 and trackball 74, is disposed on the housing 42 and is covered by the display panel 76 when the display panel 76 is in a folded position. The keyboard 72 and trackball 74 enable the user to input commands and data to the control module 40. Of course, other types of input devices could also be used, such as a touch screen or mouse.

Figure 4:
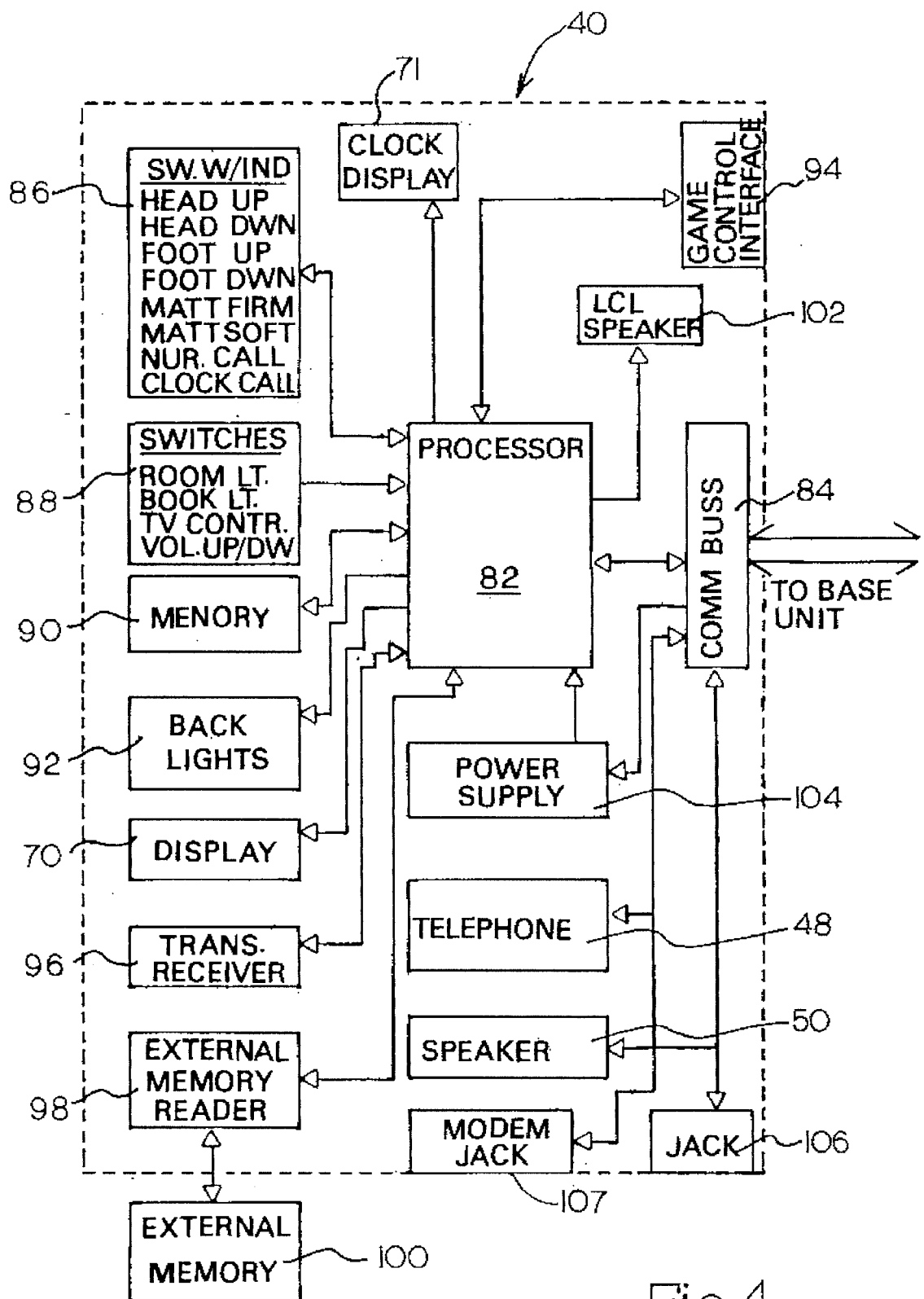
FIG. 4 is a schematic diagram of the electronic components of the bedside control module.
Figure 5:
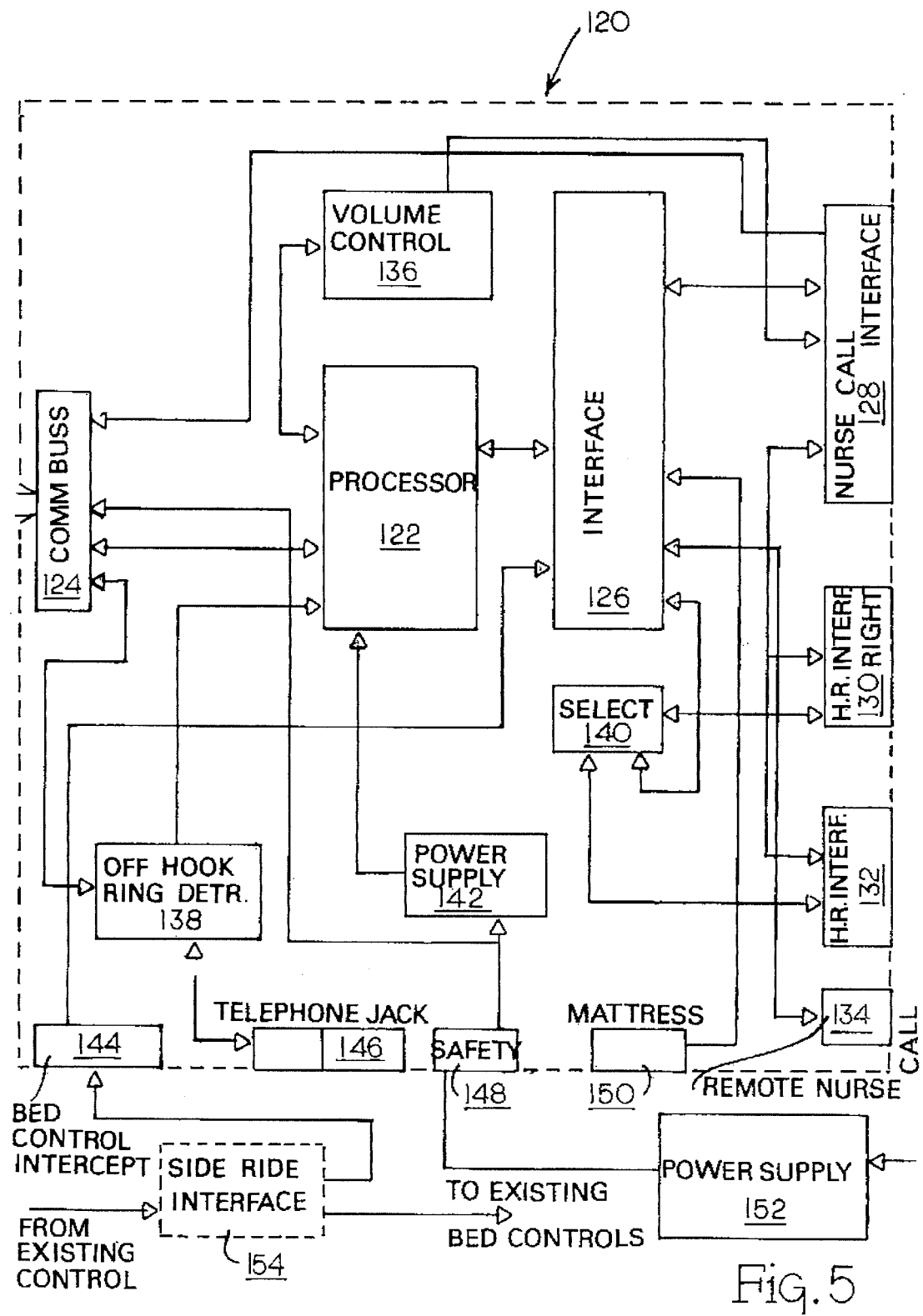
FIG. 5 is a schematic diagram of the interface control unit.
Figure 6:
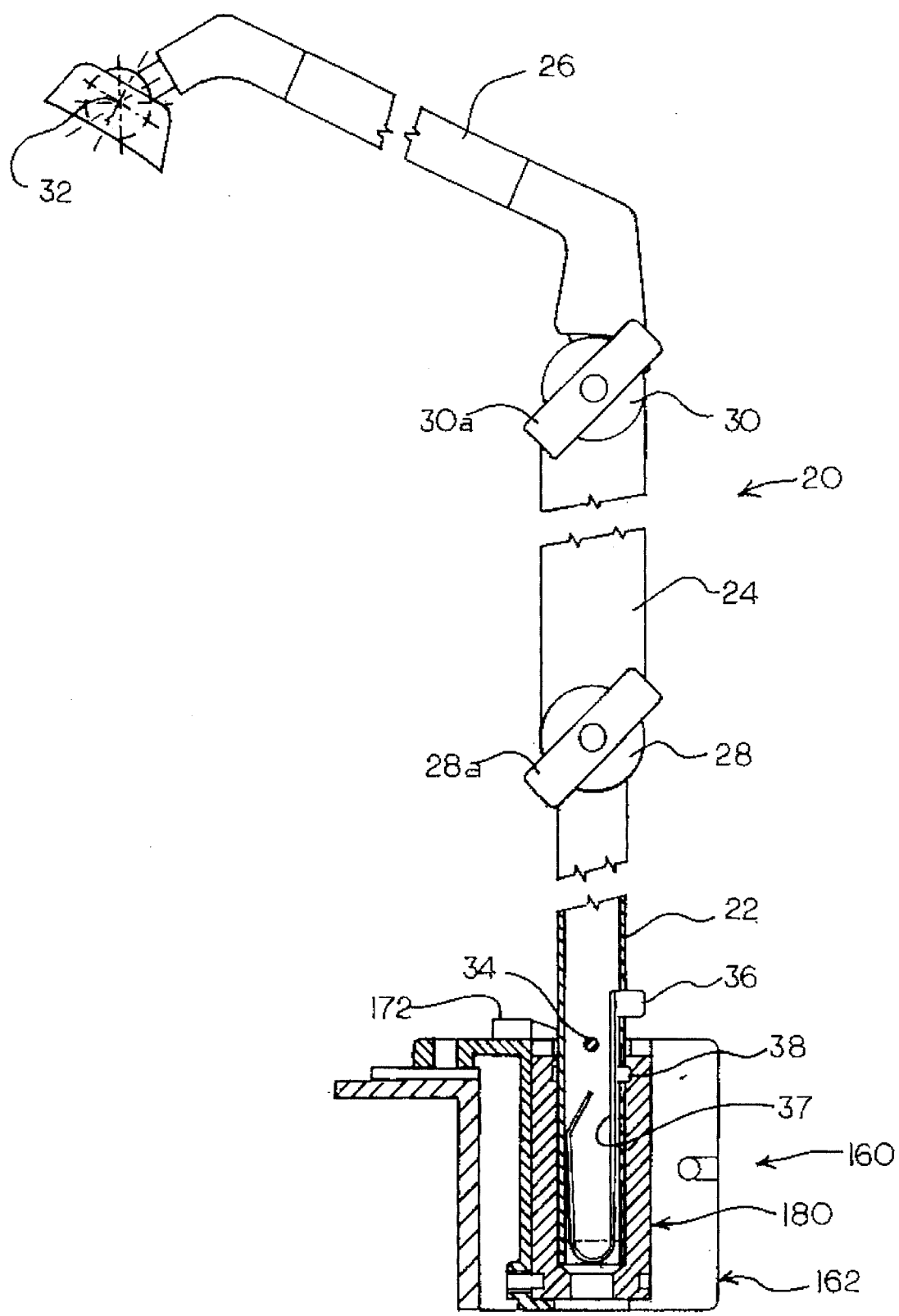
FIG. 6 is an elevation view of the articulating arm structure with the mounting bracket shown in section view.

Referring now to FIG. 4, a block diagram of the control module circuitry is shown. The heart of the control module 40 is a microprocessor 82 having internal random access memory (RAM) and read-only memory (ROM). The microprocessor 82 is connected via a communications buss 84 to an interface control module 120. (FIG. 5). A series of switches 86 with indicator lamps and switches 88 correspond to the various push buttons on the control panel 52 of the control module 40. The microprocessor 82 monitors the condition of the switches 86 and 88 and the current push-button state is reported to the interface control module 120. When a push button is pressed, the interface control unit 120 responds by directing the control module 40 to light the corresponding status indicator. This provides a positive confirmation that the push button has been sensed and acted upon. The built-in sounder 102 in the control module 40 may also provide an audible tone when a push button is pressed.

The backlights 92 are used to illuminate the various push buttons of the control panel 52 so that it can be easily used even when the room lights are turned off. The backlights 92 are normally at a low level but increase in intensity for approximately 30 seconds when a push-button is depressed. Speaker 50 provides audio for a television and/or radio in the patient's room. In a preferred embodiment, a jack 106 for an ear plug or head set is also provided so the audio can be used without disturbing another patient or individual in the patient's room. The ear plug or headset could also be used by a visitor when the patient is resting or asleep.

The control module 40 includes a fully operational telephone handset 48. The ring voltage is removed by the interface control module 120 before the telephone signal is passed to the control module 40. The internal sounder 102 on the control module 40 simulates the telephone ring. A modem jack 107 allows the control module 40 to communicate via telephone lines to other modem-equipped devices.

A memory device 90, such as an EEPROM, provides for data storage in a preferred embodiment of the invention. The memory device 90 can be used, for example, for bedside patient charting. That is, patient data can be stored in the control module 40 for patient charting. The integral keyboard 72 is used to input data into the memory device 90 and the display 70 can be used to view data stored in the memory device 90. Also, instructions on the use of the control module 40, along with suitable prompting messages, can be stored in the memory device 90 to function as a help system. The prompting messages can be output to the display 70. Remote access to data stored in the memory device 90 may also be provided by any suitable communications means such as an infrared transmitter/receiver 96, modem 107, or other data transmitting means. A reader 98 may also be used to input data directly into the control module 40 from external memory 100.

The control module 40 is connected to an interface control unit 120, shown in FIG. 5, which is preferably mounted beneath the bed 10. The interface control unit 120 provides an interface between the control module 40 and existing control functions in the bed 10. Further, the interface control unit 120 allows the upgrading of the functionality of the bed 10 to accommodate additional functions without the need of costly retrofits or need bed purchases.

The interface control unit 120 also includes a microprocessor 122 to control communications with the bedside control module 40. The microprocessor 122 is connected through an interface 126 to a 37-pin intercom nurse call interface 128, two 25-pin connectors 130 and 132 for side rail function controls, a remote nurse call interface 134, a 9-pin custom bed control interface 144, and a dual R J-11 telephone jack 146. The interface control unit 120 is connected to the control module 40 via a 15-pin interface 124. Coordination between the control module 40 and interface control unit 120 is provided by a two-wire communication protocol. Using this protocol, the control module 40 reports the current push-button state of the control panel push buttons, and the interface control unit 120 directs the state of the indicator lights and internal sounder 102. This protocol also supports transmission of information to and from an infrared communications link and an on or off-board memory device.

When a push button is pressed, the interface control unit 120 responds by directing the control module 40 to light the corresponding status indicator, and/or to increase the intensity of the backlights 92. This provides a positive confirmation that the push button has been sensed and acted upon. The built-in sounder 102 in the control module 40 may also provide an audible tone when a push button is pressed.

Due to the design of existing hospital bedside rail communication units, the T.V./intercom speaker connections are passed directly from the interface control unit 120 to the control module 40 as separately shielded leads. The RJ-11 interface uses optically isolated detectors to monitor ring and off-hook conditions. The ring voltage is then removed by the ring detector 138 before the telephone signal is passed to the control module 40. In order to maintain maximum isolation, the bed controls, nurse call, T.V., and room light controls all use electronic switches inside the interface control unit 120 to stimulate switch closure, and the nurse call answer signals from the intercom are optically isolated.

The control module 40 and interface control module 120 are powered from the bed power supply 152. The bed power supply 152 provides a low voltage AC power to the control module 40 and interface control module 120. The bed power supply 152 is connected to the internal power supplies 142 and 102 of the interface control module 120 and control module 40 respectively. A 1.0 amp fuse 148 protects interface control module 120 and control module 40 from excessive current. The internal power supplies 142 and 104 regulate voltage to 5 volts DC which complies with the safety standards for UL certification of bedside control units.

Referring now to FIGS. 6 through 9, the arm structure 20 and its mounting bracket 160 are shown in more detail. The arm structure 20 includes a mounting stem 22 which inserts into the mounting bracket 160. A first support arm 24 is pivotally attached to the stem 22 by a friction type pivot joint 28. The pivot joint 28 includes a tightening lever 28a to adjust the resistance of the pivot joint 28. The first support arm 24 is attached to a second support arm 26 by a second friction type pivot joint 30. The pivot joint 30 also includes a tightening lever 30a for adjusting the resistance of the joint. The control module 40 is attached to the outer end of the second support arm 26 by a universal type ball joint 32. The pivot joints 28 and 30 and the universal joint 32 allow smooth easy adjustment of the articulating arm from a patient situated in the hospital bed 10. In addition, the entire arm structure 20 can rotate in the mounting bracket 160 so that the arm structure 20 extends outwardly to one side of the bed 10. In this position, the control panel 40 can be used from a bedside chair.

Figure 7:
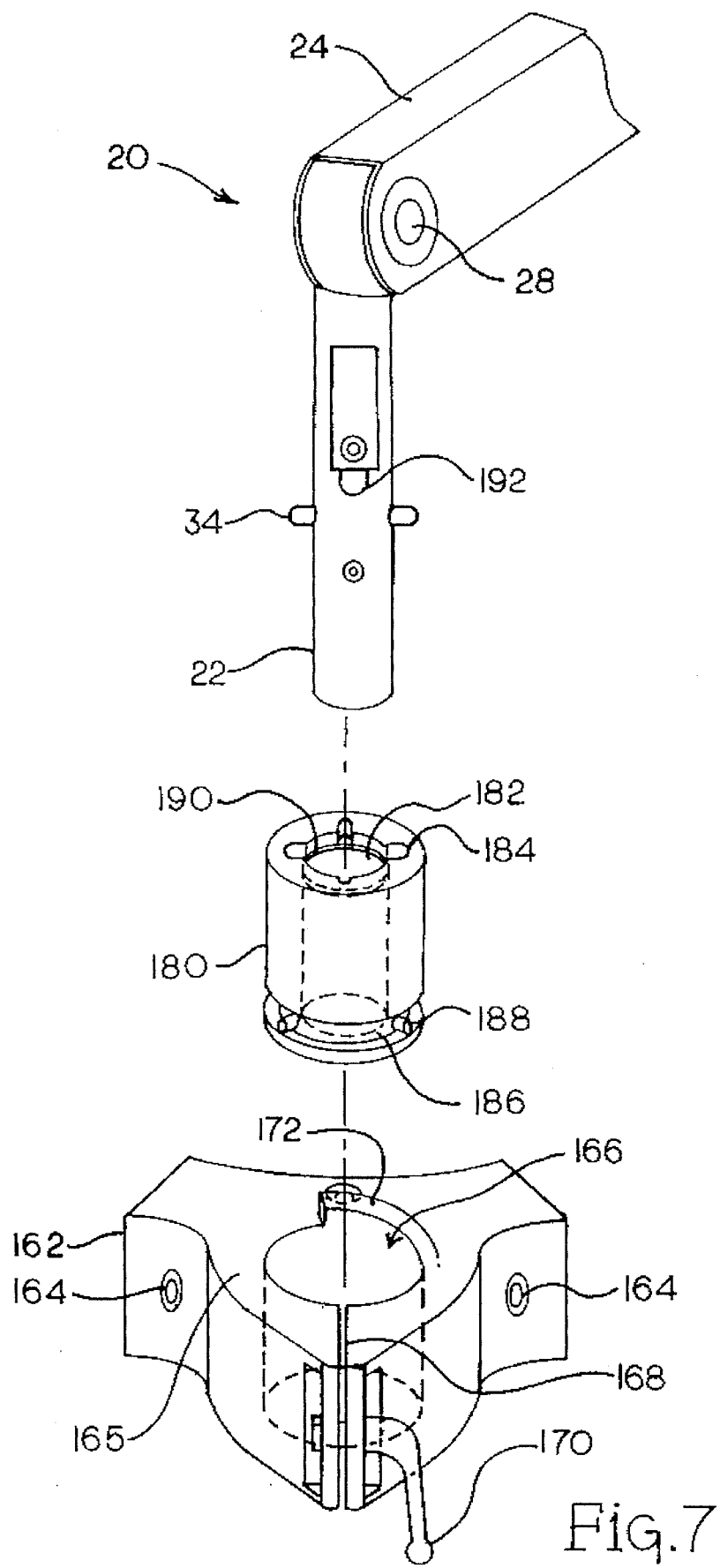
FIG. 7 is an exploded perspective view of the mounting bracket for securing the articulating arm to the bed frame.
Figure 8:
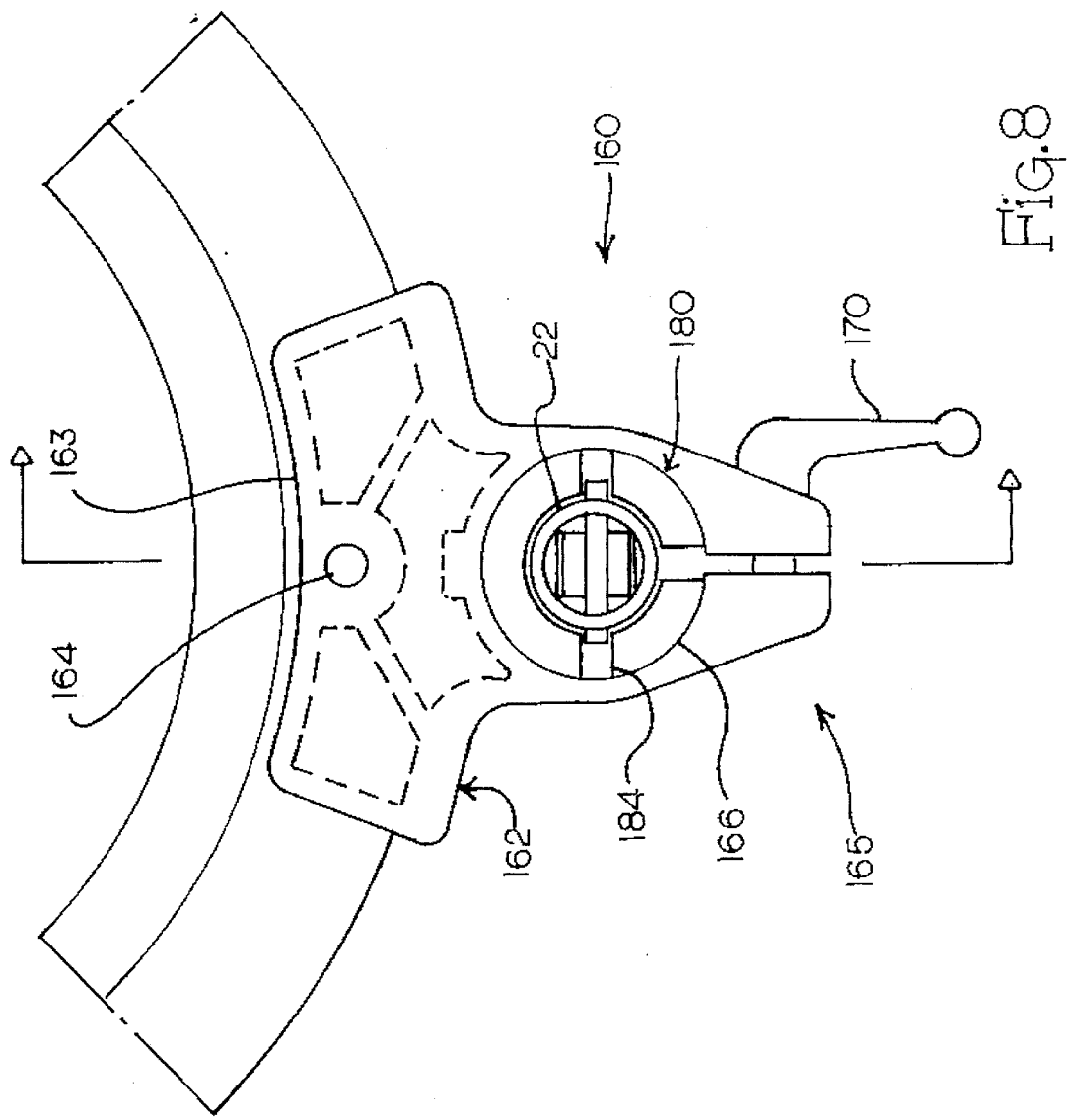
FIG. 8 is a top plan view of the mounting bracket attached to the bed frame.
Figure 9:
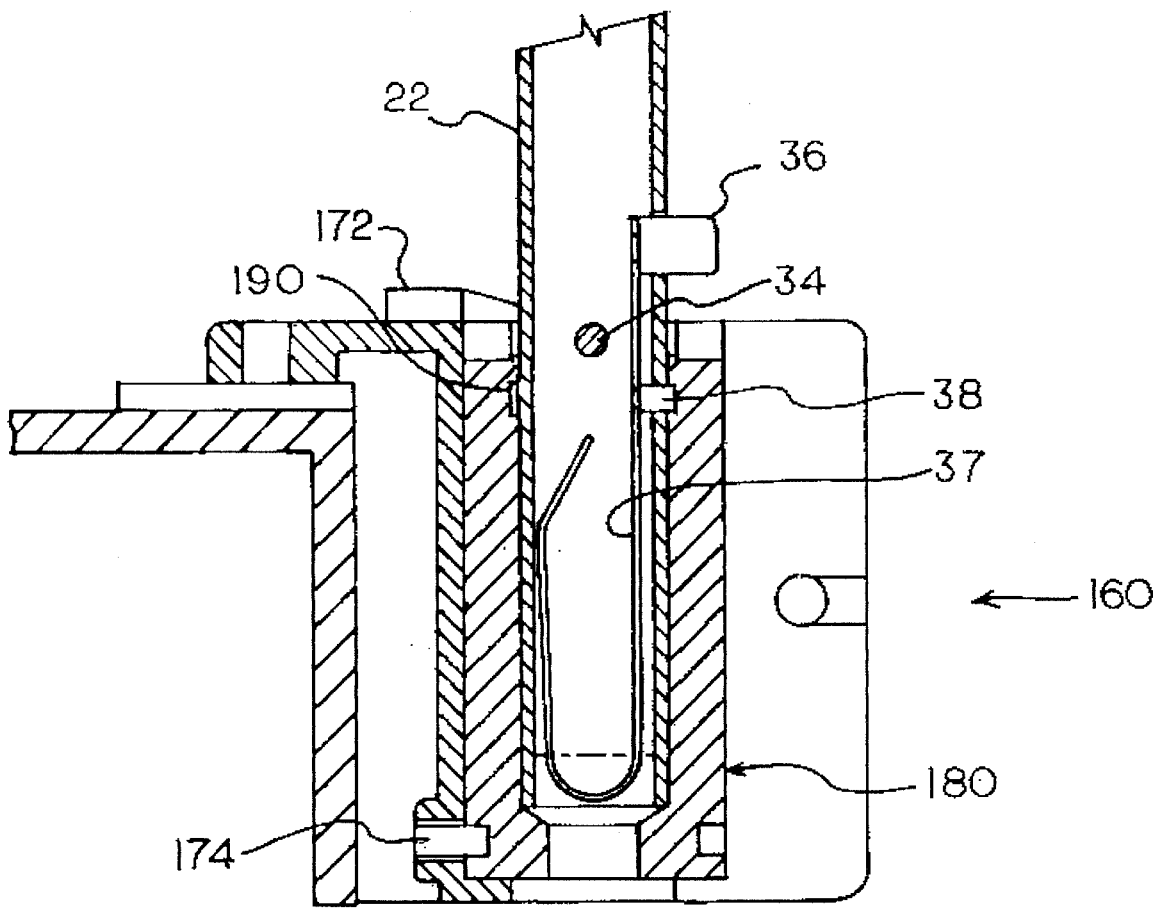
FIG. 9 is a section view of the mounting bracket.

FIGS. 7 through 9 illustrate how the articulating arm 20 is mounted to the bed frame 12. The mounting bracket 160 includes a base member 162 having a flange 163 which is secured to the frame 12 of the bed. The base member 162 is preferably secured by bolts which extend through corresponding bolt holes 164 in the base member 162. The base member 162 includes a clamping section 165 having a center hole 166 which receives a sleeve 180. The purpose of the sleeve 180 is described below. A slot 168 extends from the center hole 166 to the outer end of the clamping section 165. The clamping section 165 is divided into two segments by a slot 168. The segments of the clamping section 165 function as a clamp to apply pressure to the sleeve 180. A tightening lever 170 allows the user to adjust the pressure exerted by the clamping section 165 on the sleeve 180.

The sleeve 180 inserts into the center hole 166 of the clamping section 165. The outer diameter of the sleeve 180 roughly equals the diameter of the center hole 166. The sleeve 180 includes an axial bore 182 which receives the stem 22 of the articulating arm structure 20. Four notches 182 are formed in the top end of the sleeve 180 which are engaged by a pin 34 on the stem 22 of the arm structure 20 to prevent rotation of the stem 22 within the sleeve 180. The four notches 182 allow the stem 22 to be inserted into the sleeve 180 in four distinct orientations. This allows the base member 162 to be mounted on any of the four corners of the bed 10.

An annular groove 186 extends around the outer circumference of the sleeve adjacent the bottom end thereof. A pair of stop pins 188 are fixed in the annular groove 186. The purpose of the stop pins 188 is to limit the rotation of the articulating arm 20 as will be describe below.

A quick release mechanism, which is seen best in FIG. 9, is used to secure the articulating arm 20 in the mounting bracket 160. A release button 36 is fixed to a u-shaped spring member 37 disposed in the stem 22 of the arm structure 20. The release button 36 projects through a corresponding opening in the stem 22 where it is accessible to the user. A latch pin 38 is fixed to the u-shaped spring 37 below the release button 36. The latch member 38 also projects through a corresponding opening in the stem 22 to engage an annular groove 190 formed on the inner surface of the sleeve 180. The spring 37 passes the latching member 38 to a locked position as shown in FIG. 9. In this position, the latching member 38 prevents relative actual movement between the sleeve 180 and the stem 22. When the release button 36 is pressed, the latching member 38 disengages from the corresponding groove 190 in the inner surface of the sleeve 180 allowing the stem 22 to be removed from the sleeve 180.

The sleeve 180 is secured in the center hole of the base member 162. After the sleeve 180 is inserted into the base member 162, a set screw 174 is threaded into engagement with the annular groove 186 on the outer surface of the sleeve 180. The set screw 174 serves two functions. First, the engagement of the set screw 164 with the annular groove 186 prevents relative axial movement between the sleeve 180 and the base member 162. Additionally, the set screw 174, in combination with the stop pins 188, limits the rotation of the arm structure 20 to an arc of approximately 90°. This range can be varied, of course, by changing the angular spacing between the stop pins 188.

The sleeve 180 functions as a torque amplifier. The sleeve 180 provides a larger clamping surface than the stem 22 of the articulating arm 20. By providing a larger clamping surface, the sleeve 180 reduces the clamping force needed to prevent the articulating arm 20 from rotating under its own weight. Without the sleeve 180, a greater clamping force would be needed to maintain the articulating arm 20 in the desired position. With the clamping sleeve 180, greater friction is obtained with less clamping force. As a result, the articulating arm 20 will remain in the desired position unless an external force is applied to the articulating arm 20. The tightening lever 170 allows the user to adjust the amount of clamping force which in effect adjusts the amount of force needed to move the articulating arm to the desired position.

In another aspect of the present invention, a limit switch 192 is mounted to the outer surface of the stem 22. A cam surface 172 is formed on the top surface of the base member 162. The cam surface 172 extends through an arc of approximately 90°. The limit switch 192 is positioned on the stem 22 so as to engage the cam surface 172. The limit switch 192 is used to disable certain functions when the articulating arm 20 is rotated so that it extends away from the bed 10. For example, when the articulating arm 20 extends outside of the footprint of the bed 10, adjustment of the bed position may cause the arm to swing and hit a nearby object or person. The limit switch 192 is used in a preferred embodiment to disable the head section of the bed 10 as a safety measure.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A bedside control unit for a hospital bed which is operable from positions both within and without said bed, comprising:
   a) a base member for attaching to a frame of said hospital bed and including a rotatable member that comprises a sleeve received in a cavity on said base member, said sleeve being rotatable within said cavity;
   b) a control module having one or more manually operable controls;
   c) an articulating arm structure secured to said rotatable member and connected between the base member and the control module, said articulating arm structure including a stem insertable into an axial bore in said sleeve, a vertically extending support member pivotally connected to said stem, and an overhead support arm pivotally connected to an upper end of said vertical support member, said control module being suspended from said overhead support arm; and
   d) a quick connect mechanism for securing the articulating arm structure in the sleeve, said quick connect mechanism comprising a latching member on one of said stem and said sleeve, a mating groove engageable with said latching member in the other of said stem and said sleeve, and a biasing member for biasing said latching member into engagement with said groove;
   e) wherein said overhead support arm is movable between a first position in which said support arm extends over said hospital bed and a second position in which the support arm extends outwardly from said bed.

2. The bedside control unit of claim 1 further including a key for preventing relative rotation between said stem and said sleeve.

3. The bedside control unit of claim 1 further including limiting means for limiting the rotation of the sleeve within the base member.

4. The bedside control unit of claim 1 further including a release button for moving the latching member to a disengaged position with respect to said mating groove.

5. The bedside control unit of claim 1 further including a telephone handset connected to said control panel.

6. The control module of claim 1 further including a video controller interface on said control module for operating an interactive video device.

7. The bedside control unit of claim 1 further including an audio jack.

8. The bedside control unit of claim 1 further including a clock display.

9. The bedside control unit of claim 1 wherein said controls are backlighted.

10. The bedside control unit of claim 1 further including a data storage device within said control module and input means for inputting data into said data storage device.

11. The control module of claim 10 further including communication means for transmitting data to a remotely located host computer.

12. The control module of claim 11 wherein said communication means exchanges data with said remotely located host over preexisting audio or telephone lines.

13. The control module of claim 10 further including a multi-line display on said control module for displaying data stored in said data storage device.

14. The control module of claim 13 wherein said display is an LCD display.

15. A bedside control unit for a hospital bed that is operable from positions both within and without said bed comprising:
   a) base member for attaching to a frame of said hospital bed and including rotatable member;
   b) a support structure secured at one end to said rotatable member and movable between a first position and a second position;
   c) a control module mounted to another end of said support structure and having one or more manually operable controls; and
   d) a limit switch for disabling specified functions of said control module when said support structure is rotated to said second position.

16. The bedside control unit of claim 10 wherein said limit switch is mounted to said support structure and is vertically moveable between an enabling position and a disabling position, and wherein said base member includes a cam surface for moving said switch between said enabling position and said disabling position when the support structure is rotated.

17. A bedside control unit for a hospital bed comprising:
   a) a base for supporting said bedside control unit on a frame of said hospital bed;
   b) an adjustable support extending from said base;
   c) a control module having one or more manually operable controls mounted on said adjustable support, which are accessible to a patient lying in the hospital bed;
   d) data storage means within said control module for storing patient data;
   e) input means for entering said patient data into said data storage means; and
   f) data retrieval means for retrieving said patient data from said data storage means.

18. The bedside control unit of claim 17 further including a display means for displaying data stored in said data storage means.

19. The bedside control unit of claim 18 wherein said display means is a multi-line LCD display.

20. The bedside control module of claim 18 wherein prompting messages are stored in said data storage means for providing instructions to a user regarding use of the control module.

21. The bedside control module of claim 17 further including communication means for transmitting said data to a remotely located host computer.

22. The control module of claim 21 wherein said communication means exchanges data with said remotely located host over preexisting audio or telephone line.

23. The control module of claim 17 wherein said data retrieval means comprises a modular data telephone interface for exchanging data with a remotely located computer.

24. The control module of claim 17 wherein said data retrieval means comprises a transmitter for transmitting data to a remotely located computer.

25. The control module of claim 24 wherein said transmitter is an infrared transmitter.

26. The control module of claim 24 wherein said transmitter is a radio transmitter.

27. A bedside control unit for a hospital bed comprising:
   a) a base for attaching to a frame of said hospital bed;
   b) an adjustable support extending from said base;

c) a control module including a front side and a back side mounted on said adjustable support;

d) one or more manually operable environmental controls mounted on the front side of said control module;

e) a processor disposed within said control module;

f) data storage means operatively connected to said processor for storing data;

g) input means operatively connected with said processor and said data storage means, said input means being mounted on the back side of the control module; and h) a display operatively connected to said processor and mounted on the back side of the control module adjacent said input means.

28. The bedside control unit of claim 27 wherein said display is pivotally connected to said control module so as to be moveable between a folded position in which the display lies against the back side of the control module, and an upright position.

29. The bedside control unit of claim 28 wherein said display overlies said input means when said display is in a folded position.

30. The bedside control unit of claim 27 further including communication means operatively connected to said processor for exchanging data with a remotely located computer or hand-held device.

31. The bedside control unit of claim 29 wherein said communication means comprises a modular data telephone interface.

32. The bedside control unit of claim 30 wherein said communication means comprises an infrared or radio transmitter.

33. A bedside control unit for a hospital bed, comprising:

a) a control module mounted to a frame of the hospital bed and including
 i) one or more manually operated controls,
 ii) data storage means within said control module,
 iii) data input means for entering data into said data storage means,
 iv) a first microprocessor within said control module for performing specified data processing functions;

b) an interface module segregated from said control module for providing an interface between said control module and existing control functions of the hospital bed, said interface module including a second microprocessor for performing specified functions different from those performed by the first microprocessor; and c) a two-wire communication buss connected between said control module and said interface module for coordinating functioning of the first and second microprocessors.

34. The bedside control unit of claim 33 wherein said first microprocessor includes internal random access memory and read-only memory.

35. The bedside control unit of claim 33 wherein said interface module is mounted beneath the hospital bed.

36. The bedside control unit of claim 33 wherein said second microprocessor is connected to a nurse call interface.

37. The bedside control unit of claim 33 wherein said control module includes control panel push-buttons and indicator lights.

38. The bedside control unit of claim 37 wherein said control module reports current push-button states of said control panel push-buttons to said interface module.

39. The bedside control unit of claim 38 wherein said interface module activates the indicator lights in response to the current push-button states.

40. The bedside control unit of claim 33 wherein the hospital bed includes a power supply and wherein said control module and said interface module are connected to the bed power supply.

\* \* \* \* \*